3,193,350
METHOD OF PRODUCING HIGHER POLYPHOSPHORIC ACIDS
Klaus Beltz and Franz Rodis, Knapsack, near Cologne, and Herbert Panter, Bruhl, near Cologne, Germany, assignors to Knapsack-Griesheim Aktiengesellschaft, Knapsack, near Cologne, Germany, a corporation of Germany
Filed Mar. 3, 1961, Ser. No. 93,135
Claims priority, application Germany, Mar. 5, 1960, K 40,089
4 Claims. (Cl. 23—165)

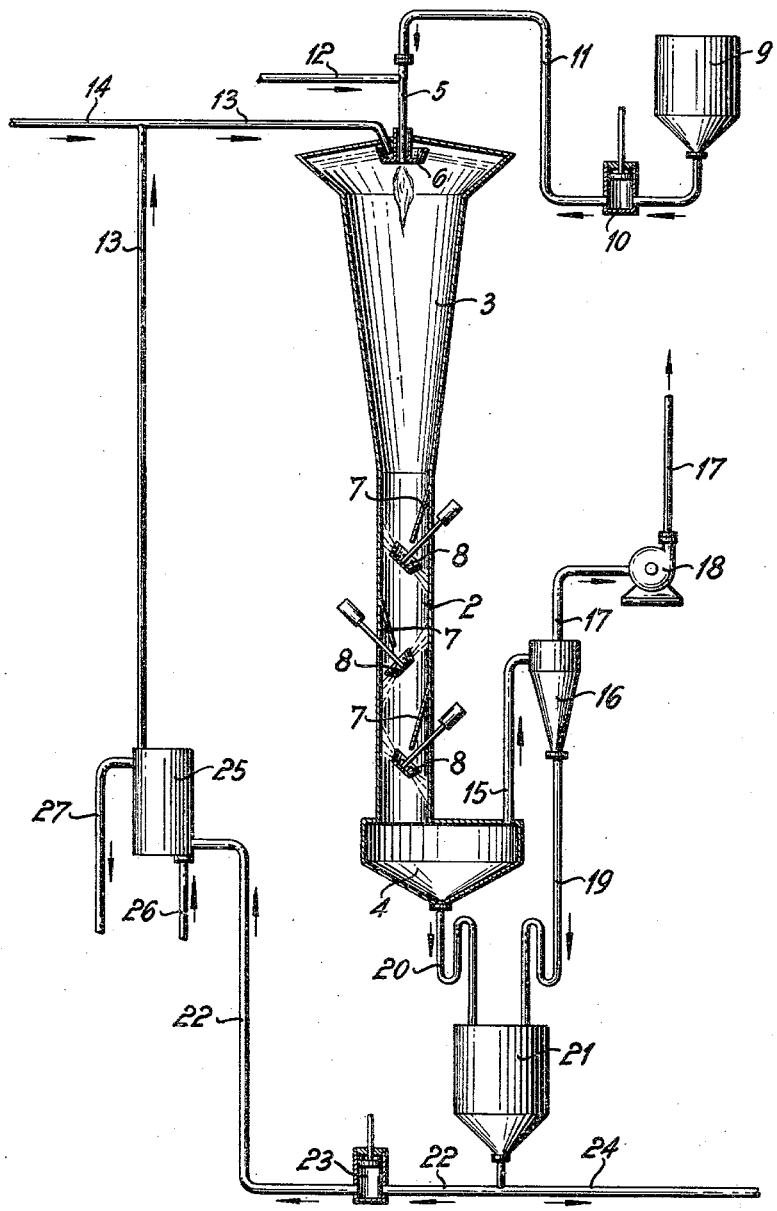

The present invention relates to a method of producing higher polyphosphoric acids by burning elementary phosphorus with air and/or oxygen-containing gases followed by absorption of the resultant $P_2O_5$ in lower polyphosphoric acids, and to an apparatus for carrying out the method of the invention.

By polyphosphoric acid, within the meaning of the present invention, there are understood all phosphoric acids, the $P_2O_5$ content of which is higher than 72.4% by weight. 72.4% by weight corresponds to the $P_2O_5$ content of anhydrous orthophosphoric acid. In accordance with modern scientific knowledge, acids having more than 72.4% by weight $P_2O_5$ are mixtures of linear-condensed polyphosphoric acids of the general formula $H_{n+2}P_nO_{3n+1}$ having an equilibrium distribution of the chain lengths. The percentage of acids of large chain length is the greater the higher the $P_2O_5$ content of the mixture. Polyphosphoric acids having a $P_2O_5$ content of between about 72.4 and 82% by weight contain predominantly short-chain and medium-chain phosphoric acids with up to 10 P-atoms per molecule (including orthophosphoric acid) while polyphosphoric acids having $P_2O_5$ contents of more than 82% by weight contain considerable quantities of long-chain phosphoric acids having more than 10 P-atoms per molecule. The present invention is particularly suitable for the preparation of polyphosphoric acids having up to about 87% by weight $P_2O_5$.

It is already known to prepare polyphosphoric acid by burning phosphorus. In one of the previously known methods, the phosphorus is burned in a combustion chamber and the gaseous combustion product, after partial cooling in an indirect cooler is conducted into a packed absorption tower in which the absorption of the $P_2O_5$ by polyphosphoric acid then takes place.

Combustion chamber, cooler and connecting lines must consist of material resistant to high temperatures. The temperature at which the gases enter the absorption tower should be more than 350° C. In the combustion tower itself temperatures which are even considerably higher than this prevail. Another disadvantage of the method is the necessity of drying the combustion air so that no solid polyphosphoric acid can separate out in the combustion tower.

It is furthermore known to prepare orthophosphoric acid by burning phosphorus in combustion towers, the walls of which are sprayed with circulating acid. This method is not suitable, in the form heretofore proposed, for the preparation of polyphosphoric acids. The entire amount of the $P_2O_5$ formed is not hydrated in the combustion chamber itself. In order to remove a considerable part of the $P_2O_5$, subsequent apparatus, such as Cottrell gas purification chambers or Venturi gas scrubbing systems are required. The subsequent apparatus fail when the concentration of the phosphoric acid becomes too high, i.e., when it is desired to produce polyphosphoric acid. Since the $H_2O$ partial pressure in the combustion gas, upon the production of polyphosphoric acid is only very low, the Cottrell chambers, as well as the connecting lines between the combustion chamber and the gas purification apparatus, become clogged by solid $P_2O_5$ which settles out. Venturi systems can furthermore not be satisfactorily operated with polyphosphoric acid in view of the high viscosity of this acid.

Another known method of arriving at polyphosphoric acid is to allow a phosphorus flame to burn into a rotating pipe in which a sump of polyphosphoric acid is located. The wall of the pipe remains coated with a layer of polyphosphoric acid as a result of the rotation. For the complete absorption of $P_2O_5$, a subsequent scrubbing tower is provided.

Furthermore, it has already been proposed to prepare polyphosphoric acid by introducing solid $P_2O_5$ into phosphoric acid or by concentrating orthophosphoric acid. The latter can be effected for example, in accordance with one proposed method, by removing water from the phosphoric acid by electrolytic decomposition. All of these methods, however, are unsatisfactory if it is desired to produce polyphosphoric acid on a large industrial scale and in both an economic and continuous manner.

There has now been discovered a method and an apparatus by means of which it is possible to burn elementary phosphorus with air and or oxygen-containing gases so as to form $P_2O_5$ and to absorb the resultant $P_2O_5$ in lower polyphosphoric acids with the formation of higher polyphosphoric acids.

The method and the apparatus of the invention are characterized by the fact that the $P_2O_5$-containing stream of hot gas obtained in the combustion zone of a funnel-shaped reaction chamber flows to the absorption zone of the same reaction chamber, a part of the lower polyphosphoric acid which travels down the walls of the reaction chamber being removed and sprayed in the reaction chamber by means of known atomizers into particles having a relatively high velocity.

The method is advisedly carried out in a tower-like chamber in the upper part of which the combustion takes place and in the lower part of which the absorption takes place. If there is used a tower which tapers conically down from above, assurance is present that the film of lower polyphosphoric acid which travels down the walls will not tear apart so that the walls will be completely covered without gaps by phosphoric acid.

The combustion tower need not be constructed of material which is resistant to high temperatures. The heat of combustion of the phosphorus is carried away by the film-forming phosphoric acid which is recycled and cooled by indirect heat exchange. It is therefore sufficient to construct the combustion chamber of acid-proof refined alloy steel which is resistant for instance to polyphosphoric acid up to about 130° C.

The amount of water required for the formation of polyphosphoric acid from $P_2O_5$ can be added to the system at any desired point. The water can be added as such, or else in the form of orthophosphoric acid prepared in normal manner.

The mechanical means which serve for distributing the polyphosphoric acid into droplets which have a high velocity as compared with the $P_2O_5$-containing stream of gas can be atomizing plates or atomizing disks or other means known per se. In case of the production of very concentrated polyphosphoric acids, there have proven particularly satisfactory rotating atomizers which are fed by the acid flowing down from the combustion part of the chamber, so that no separate addition of acid is necessary.

The dividing up of the polyphosphoric acid droplets is effected in order to obtain the highest possible relative velocity of the polyphosphoric acid droplets with respect to the gas, preferably in a direction transverse or opposite to the direction of the $P_2O_5$-containing stream of gas. In case the two components move in the same direction or approximately in the same direction, a correspondingly higher initial velocity of the polyphosphoric acid droplets is required. There is thus a relationship between the velocity of atomization and the direction of atomization with respect to the stream of gas.

The accompanying drawing shows one particularly satisfactory embodiment of the apparatus in accordance with the present invention. Phosphorus is conducted from the storage tank 9 by means of the metering pump 10 and via the feed line 11 to the combustion nozzle 5. The phosphorus burns out of this downward-directed nozzle 5 with the aid of the air which is introduced via the feed line 12. The combustion nozzle 5 is placed through the hollow shaft of a rotating atomizer disk 6. By means of this atomizer disk 6, the circulated polyphosphoric acid is introduced into the upper part 3, the combustion zone of the reaction tower. This polyphosphoric acid first of all forms a veil below the cover of the combustion zone and in this way prevents the production of a solid layer of $P_2O_5$ below the cover. The polyphosphoric acid then strikes against the conical side wall and runs down this wall in the form of a film. The elongated vertical absorption zone 2 located below same is of cylindrical construction in its lower part, while the upper part is developed at first with a strong taper as combustion zone 3, while the medium part of the reaction tower is then made with slighter taper.

For the absorption of the $P_2O_5$ mist in the polyphosphoric acid, there are arranged in the cylindrical absorption zone 2, for instance, three rotating atomizers 8 arranged one above the other, these atomizers being fed by means of baffle plates 7 with a part of the acid flowing down along the walls. This acid is atomized by the atomizers 8 into a veil consisting of drops of high velocity. In this way the acid absorbs the $P_2O_5$ present in the gas space. The polyphosphoric acid is thereupon combined in the underlying collector 4. From here it travels via the bottom discharge line 20 to the storage tank 21 and is conveyed back from there via the recycle line 22 and the circulating pump 23 through the heat exchanger 25 and the feed line 13 to the atomization centrifuge 6.

The heat exchanger 25 is provided with coolant, and particularly water, via the feed line 26, the coolant discharging again through the discharge line 27.

The off-gas which is practically entirely freed of $P_2O_5$, is fed via the off-gas line 15 to the droplet separator 16 and withdrawn from the blower 18 via the off-gas line 17. The reflux from the droplet separator 16 passes via the return line 19 also into the storage tank 21.

The circulatory system is fed with water or orthophosphoric acid through the feed line 14 while a part of the concentrated higher polyphosphoric acid is withdrawn via the acid discharge line 24. The acid discharge line 24 can be located, as shown in the drawing, below the storage tank 21 if on the other hand the feed line 14 enters the circulatory system only behind said branching-off point of the acid discharge line 24. The acid discharge line 24 can however also be branched off from the collecting tank 4 or between it and the storage vessel 21, in which case the feed line 14 for, for instance, water can then discharge into said latter storage vessel 21.

Since the combustion and absorption space in accordance with the present invention is surrounded on all sides by a film of polyphosphoric acid, there is no longer any danger of solid $P_2O_5$ depositing on the walls, roof or any other points, such as for instance in the connecting lines, even though these walls are not hotter than at most 130° C. Since approximately the entire amount—namely at least 98%— of the $P_2O_5$ formed is absorbed in the combustion and absorption chamber by the circulating polyphosphoric acid, this danger of a disturbing deposition is reduced to a minimum also in the subsequent system of pipes.

In accordance with the present invention, in the method of preparing higher polyphosphoric acid by burning elementary phosphorus with air and/or oxygen-containing gases, followed by absorption of the resultant $P_2O_5$ in phosphoric acid, one operates in such a manner that the $P_2O_5$-containing hot stream of gas discharging from the combustion zone is fed to an absorption zone of the same reaction tower in which lower polyphosphoric acid for the absorption of the $P_2O_5$ is atomized by mechanical means into particles which have a high velocity as compared with the $P_2O_5$-containing stream of gas. In this connection the atomization of the polyphosphoric acid introduced for the absorption takes place in a direction between approximately transverse to and opposite to the direction of the $P_2O_5$-containing stream of gas, in which connection the ratio of the velocity of polyphosphoric acid introduced for the absorption to the velocity of the $P_2O_5$-containing stream of gas in greater than about 2:1 and preferably greater than about 10:1. As a matter of fact, the velocity ratio is the greater the more the direction of flow of the $P_2O_5$-containing gases and the initial direction of atomization of the polyphosphoric acid employed for the absorption differ from the direction opposite each other.

The polyphosphoric acid withdrawn is, in the method of the invention, returned at least in part in recycle to the absorption zone and there again is finely divided up. The amount of water required for the formation of polyphosphoric acid from $P_2O_5$ and replacing the amount of higher polyphosphoric acids removed is added preferably in the form of orthophosphoric acid which is fed to the circuit.

In accordance with another concept of the present invention, the walls of the combustion and absorption zones are covered with a preferably moving film of polyphosphoric acid. The $P_2O_5$-containing gases discharging from the flame zone enter the absorption zone at a temperature of about 200° to 2500° C. but in general, however, at a temperature of less than about 2000° C. The recycle polyphosphoric acid enters the combustion and absorption zone at a temperature of about 70 to 130° C. and in general between about 80 and 120° C. and is removed from said zone at a temperature of about 80 to 140° C., and in general between about 90° and 130° C. However, these temperatures may be exceeded in either direction.

The apparatus for the carrying out of the method of the invention consists of a preferably vertical reaction tower with an absorption tower part 2 and a combustion tower part 3 located above same, as well as a collector vessel 4 located below same and an acid recycle system, a downward-directed combustion nozzle 5 which is fed with phosphorus and oxygen-containing gases being located at the upper end of the combustion tower part 3 and extending through the hollow shaft of a rotating atomizer 6 which serves to atomize polyphosphoric acid in direction toward the upper end of the lateral tower walls, baffle plates 7 being arranged in the underlying absorption tower part 2, these plates partially removing polyphosphoric acid flowing downward along the walls of the tower and feeding it to mechanical means which serve to break up said acid into particles of high velocity in the inside of the absorption zone. As mechanical means for the dividing up of the polyphosphoric acid in the inside of the absorption zone, there are provided for example a plurality of rotating atomizers 8 arranged one behind the other.

In accordance with the invention, the combustion tower part 3 is of funnel-shaped development, the funnel angle being possibly reduced several times in the direction toward the lower absorption tower part 2. The walls of the absorption zone 2 and of the combustion zone 3 can consist of acid-proof steel.

The following example serves to illustrate the invention but it is not intended to limit it thereto.

Example

In the combustion zone 3 of a reaction tower 25 kg. of elementary yellow phosphorus per hour were burned by means of a combustion nozzle 5. For this 200 cubic meters (STP) of air per hour were added. For the absorption of the resultant $P_2O_5$ and for the discharge of the heat of combustion, there were maintained in circulation within the combustion zone 3 and the absorption zone 2 13 cubic meters per hour of polyphosphoric acid. This polyphosphoric acid had a $P_2O_5$ content of about 84% by weight. It was fed into the combustion tower 3 by the rotating atomizer 6 which surrounded the combustion nozzle 5 in which connection it first of all moved directly below the cover of the tower, forming a veil, toward the lateral tower walls and trickled down the walls there in the form of a closed film. In the absorption tower part 2, the acid was removed by baffle plates 7 from the walls and atomized by rotating atomizers 8 at different points and possibly in different direction, in which connection it served to absorb the $P_2O_5$ contained in the stream of gas. The acid, upon passage through the tower, heated from about 103° C. to about 117° C. A corresponding cooling was again effected in the heat exchanger 25. This heat exchanger 25 was operated with 7 cubic meters of cooling water of 15° C. which experienced heating to about 34° C. About 11 kg. of water were added per hour via the feed line 14 to the polyphosphoric acid circuit. The amount of 84% polyphosphoric acid produced per hour was about 69 kg., which was removed through the acid discharge line 24. The $P_2O_5$ yield was accordingly 99.5%.

We claim:

1. A process for the preparation of polyphosphoric acids containing from above 72.4 percent by weight to 87 percent by weight $P_2O_5$ which comprises:
   (A) burning in a stationary reaction chamber elementary phosphorus with gases containing oxygen to form a hot gas stream containing $P_2O_5$,
   (B) passing the resulting hot gas stream which accumulates in a burning zone within the stationary reaction chamber downwardly at a temperature between 200 and 2,500° C. to an absorption zone within the same stationary reaction chamber,
   (C) flowing a lower polyphosphoric acid whose $P_2O_5$ content is below the $P_2O_5$ content of the acid to be produced down along the inner walls of the stationary reaction chamber into said absorption zone, said lower polyphosphoric acid initially having a temperature between 70 and 130° C.,
   (D) collecting a portion of said lower polyphosphoric acid flowing down the walls and atomizing and discharging it in a direction countercurrent to the direction of the hot gas stream containing $P_2O_5$, the ratio of the velocity of the particles of atomized lower polyphosphoric acid to the velocity of the gas stream containing $P_2O_5$ being greater than 2:1.

2. A process according to claim 1 wherein the acid produced is recycled after previously diluting it with at least one substance selected from the group of water and orthophosphoric acid in an amount corresponding to the amount of polyphosphoric acid removed as final product to maintain the desired concentration.

3. A process according to claim 1 wherein the polyphosphoric acid produced is removed from the lower part of the absorption zone.

4. A process according to claim 1 wherein the ratio of the velocity of the particles of atomized polyphosphoric acid to the velocity of the gas stream containing $P_2O_5$ is greater than about 10:1.

References Cited by the Examiner

UNITED STATES PATENTS

| | | | |
|---|---|---|---|
| 1,560,527 | 11/25 | Bassler | 261—90 |
| 1,700,708 | 1/29 | Pistor et al. | 23—165 |
| 1,990,233 | 2/35 | Hechenbleikner | 23—165 |
| 2,272,414 | 2/42 | McCullough | 23—165 |
| 2,303,318 | 12/42 | Baskerville | 23—165 |
| 2,708,620 | 5/55 | Winnicki | 23—165 |
| 2,797,151 | 6/57 | Schnur et al. | 23—283 |
| 2,950,180 | 8/60 | Kunzer et al. | 23—283 |

MAURICE A. BRINDISI, *Primary Examiner.*